(12) United States Patent
Livengood et al.

(10) Patent No.: US 7,990,573 B2
(45) Date of Patent: Aug. 2, 2011

(54) USER-ADJUSTABLE MECHANISM FOR EXTRACTING FULL COLOR INFORMATION FROM TWO-COLOR INK DEFINITIONS

(75) Inventors: Steven F. Livengood, Laguna Niguel, CA (US); Mark A. Gaines, Hawthorne, CA (US); Thomas E. Horton, Torrance, CA (US); Robert R. Laman, Rancho Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 2128 days.

(21) Appl. No.: 10/802,213

(22) Filed: Mar. 17, 2004

(65) Prior Publication Data

US 2005/0225782 A1 Oct. 13, 2005

(51) Int. Cl.
*H04N 1/60* (2006.01)
(52) U.S. Cl. ............ 358/1.9; 358/1.1; 358/518
(58) Field of Classification Search ............ 358/1.9, 358/1.4, 515, 517, 518, 520, 523, 526, 529, 358/539; 382/167, 162, 164; 345/589, 590
See application file for complete search history.

(56) References Cited

U.S. PATENT DOCUMENTS

| | | | |
|---|---|---|---|
| 5,134,493 A | 7/1992 | Laman et al. | |
| 5,153,739 A | 10/1992 | Laman et al. | |
| 5,208,636 A * | 5/1993 | Rees et al. | 399/159 |
| 5,237,425 A * | 8/1993 | Tagami et al. | 358/300 |
| 7,035,460 B2 * | 4/2006 | Gallagher et al. | 382/167 |
| 7,426,060 B2 | 9/2008 | Nishide et al. | |
| 2003/0227638 A1 * | 12/2003 | Draaisma | 358/1.9 |
| 2004/0239969 A1 * | 12/2004 | Shoda et al. | 358/1.9 |
| 2005/0157921 A1 * | 7/2005 | Herron | 382/162 |
| 2005/0174586 A1 * | 8/2005 | Yoshida et al. | 358/1.9 |

FOREIGN PATENT DOCUMENTS

JP 2003-348366 12/2003
JP 2004306323 * 11/2004

* cited by examiner

*Primary Examiner* — Chan S Park
*Assistant Examiner* — Iriana Cruz
(74) *Attorney, Agent, or Firm* — Duane C. Basch; Basch & Nickerson LLP (57) ABSTRACT

The present invention is a method for taking a named, two-color definition and converting that two-color definition from the form used in highlight-color page composition and print systems into a full-color representation in order to enable the use of the two-color definitions on full-color printers. The method further contemplates the use of an extensible markup language schema to represent and store the equivalent, converted color definitions.

14 Claims, 3 Drawing Sheets

USER-ADJUSTABLE MECHANISM FOR EXTRACTING FULL COLOR INFORMATION FROM TWO-COLOR INK DEFINITIONS

This invention relates generally to a method of converting two-or highlight-color data streams into full-color image definitions, and more particularly to the user-adjustable conversion of line-conditioned data stream (LCDS) image definitions used in a highlight-color LCDS system to full-color image data for rendering by a full-color output device.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

Highlight-color printers typically print text in one, primary color, usually black, and can print areas of highlight color (e.g., borders, signatures, underlines, etc.), in another primary color such as blue, green, or red. In well-known highlight-color printers, the photo-conductor is charged in the form of an image where some areas are charged positively and some areas are charged negatively relative to non-image areas. Then, using a black toner with a positive potential and a color toner with a negative potential, both black text and colored highlight areas are developed and printed on a substrate in a single pass. Such a system is described, for example, in U.S. Pat. No. 5,208,636 to Rees et al., issued May 4, 1993, the teachings of which are hereby incorporated by reference in their entirety. Highlight colorant can be any color for which a toner has been developed. One or both toners may be applied to paper or similar substrates in various combinations, such as by halftoning, so as to expand the range of apparent colors available from the printer. For example, the resultant variations with red highlight and black toner can vary from white, light pink and light gray to red or black.

Various document composition and set-up systems exist to support highlight color output devices but the output of these conventional systems are incompatible with full-color devices and their required image descriptions. Accordingly, the present invention is directed to a method to convert two-color definitions designed for highlight color printing systems to full-color definitions in order to take advantage of advanced color-rendering algorithms and to facilitate the migration of highlight-color applications to full-color-printers.

Heretofore, several patents disclosed the concepts of two- or highlight-color ink catalogs and associated data streams to operate highlight-color printers. The following patents are hereby incorporated by reference in their entirety:

U.S. Pat. No. 5,134,493 to Laman et al., issued Jul. 28, 1992, discloses a language for describing image colors in an organized manner, wherein the language names primary colors, color catalogs and palettes within catalogs, bitmaps used to create the palette colors which include screens, and the actual palette colors themselves (defined by combinations of defined colors, bitmaps and screens), which may be loaded into highlight-color printers for rendering.

U.S. Pat. No. 5,153,739 to Laman et al., issued Oct. 6, 1992, teaches a printing system in which a variety or colors and shapes are created and may be stored as though they were fonts, and then rendered so as to produce highlight and/or multi-color images.

U.S. Pat. No. 5,237,425 to Tagami et al., issued Aug. 17, 1993, discloses a compiler for producing, from an Ink Source Language, a catalog of colors using two colorants (e.g., black plus highlight color) for use in a printer.

The present invention is directed to a method to take a named, two-color definition and convert that two-color definition from the form used in highlight-color page composition and print systems into a full-color representation in order to enable the use of the two-color definitions on full-color printers. The method allows full-color marking engines to be used in what may have been a highlight-color only environment. The method employs at least one function, which may be user-defined, to produce a standard full-color representation (e.g., sRGB) for various combinations of two toner colors (e.g., highlight plus black). The sRGB definition can then be used in a printer-independent manner on monochrome, highlight, or full-color printers using existing color-rendering algorithms. In one embodiment a user can vary or fine-tune the conversion by altering the behavior of the user-supplied functions.

In accordance with the present invention, there is provided a method for converting input data representing a color formed from only two primary colors to output data representing a color in a full-color space, comprising the steps of: receiving the two-color input data in the form of two colors, a primary color and a secondary color; mapping each color of the two-color input data to an equivalent color defined in the full color space by applying a first mapping function to each color of the two-color input data; determining, from the two-color input data, a rendering (screen) characteristic for each of the primary color and the secondary color; based upon the rendering characteristics, and the primary and secondary colors, representing a combination of the primary and secondary colors, and the associated rendering characteristics, as an intermediate output; and processing the intermediate output using a second function to generate the output data representing a single color defined in the full color space.

In accordance with another aspect of the present invention, there is provided a method for converting input data representing a color formed from only two primary colors to output data representing a color formed from at least three colors, comprising the steps of: receiving the two-color input data in the form of two colors, a primary color and a secondary color; determining, for each color of the two-color input data, an equivalent color defined in a full-color space by applying a first function to each color of the two-color input data; determining, from the two-color input data, a screen characteristic for the primary color and the secondary color; determining which screen characteristic is of a lesser value, and then determining if the lesser value is equal to zero; if the screen characteristic is zero, generating an intermediate output that is a function of only one of the primary and secondary colors, otherwise, generating an intermediate output that is a function of both the primary and secondary colors, wherein the intermediate outputs include a highlight color, a highlight color percentage and a black percentage; and processing the intermediate output using a second function to generate the output data representing a single color defined in at least three color space.

In accordance with yet another aspect of the present invention, there is provided a method of instructing a printing system which prints in at least three colorants to print a predetermined color defined using only a first and second color, comprising the steps of: creating a schema to represent said first and second colors, said palette including, palette names and colorant names, for generating different colors; using a processor, determining, for each color of the two-color input data, an equivalent color defined in a full-color space by applying a first function to each color of the two-color input data; determining, from the two-color input data, a screen characteristic for the primary color and the secondary color; determining which screen characteristic is of a lesser value, and then determining if the lesser value is equal to zero; if the screen characteristic is zero, generating an intermediate output that is a function of only one of the primary and secondary colors, otherwise, generating an intermediate output that is a function of both the primary and secondary colors, wherein the intermediate outputs include a highlight color, a highlight color percentage and a black percentage; and processing the intermediate output using a second function to generate the output data representing a single color defined in at least three color space and storing said output data in a schema.

The present invention finds particular advantage because of its ability to convert existing color-rendering mechanisms to a form suitable for new, full-color target printers. The present method can be applied in real time as each highlight-color combination is identified, converted as required, and passed immediately to the rendering algorithm. Alternatively, it can be pre-applied to an entire set of color combinations in ink catalogs (e.g., upon installation of each ink catalog on the target printer) and the results stored in a pre-defined format, which are subsequently used in the manner of a look-up table for rendering.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information (e.g., aspects descriptive of a color). When an item of data can indicate one of a number of possible alternatives, the item of data has one of a number of "values." For example, a binary item of data, also referred to as a "bit," has one of two values, interchangeably referred to as "1" and "0" or "ON" and "OFF." Similarly, a multibit item of data may be used to specify a value within a range. For example, a saturation level for a particular color description may be at one extreme representing a "fully saturated" color, at another extreme (e.g. zero) indicating "unsaturated," or somewhere in between.

A "processor" is any component or system that can process data, and may include one or more central processing units or other processing components.

An "image" is a pattern of physical light. An image may include characters, words, and text as well as other features such as graphics, all or some of which may be represented or rendered in one or more colors. An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space definitions or coordinates in a "color representation" of an image, the binary form, gray scale form, and color coordinate form each being a two-dimensional array defining an image.

A "version" or "representation" of an image is a second image produced using one or more items of data defining the first image. It will be appreciated that the second image may be identical to the first image, or it may be modified by loss of resolution, by changing the data defining the first image, or by other processes that result in a modified version.

An "image output device" (IOT) is a device that can receive an item of data defining an image and provide the image as output. A "printer" is an example of an image output device that provides the output image on a substrate in human viewable form. The visible pattern presented by a printer is a "printed image" or simply "image."

Figure 1:
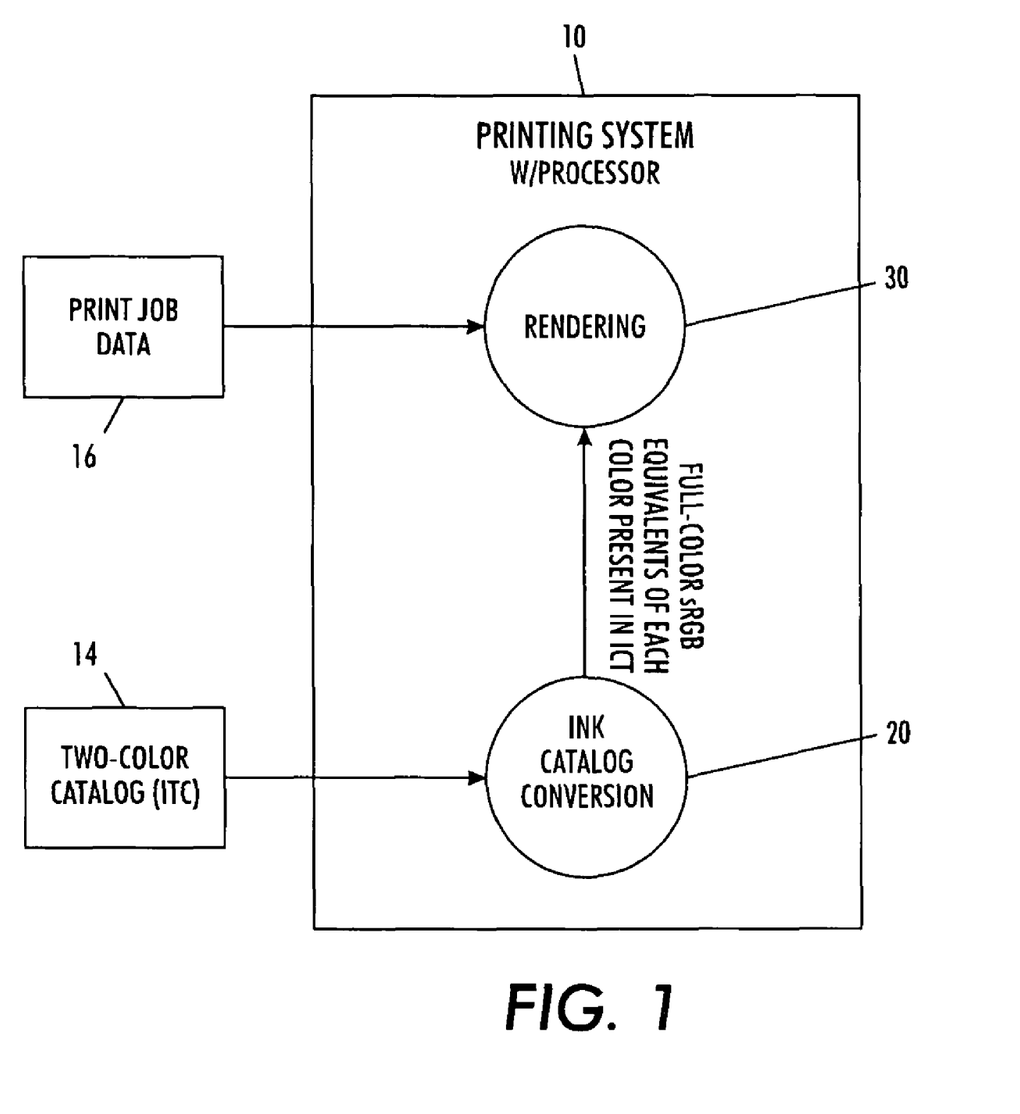
FIGS. 1 and 2 illustrate, in a general schematic form, alternative embodiments for the present invention.
Figure 2:
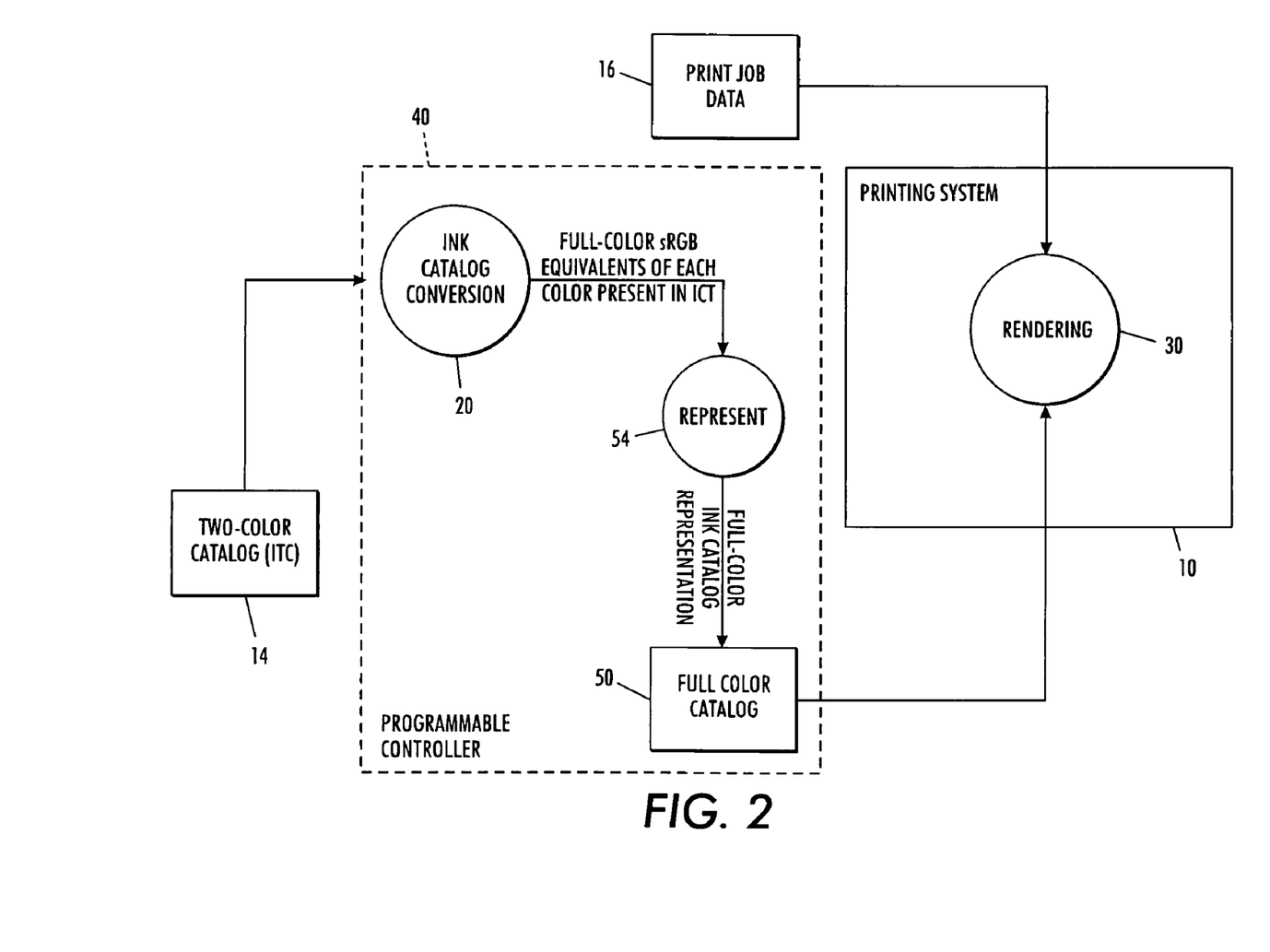

Referring to FIGS. 1 and 2, there are depicted two alternative embodiments for aspects of the present invention. Although it will be appreciated that the methods described herein are intended to operate on a processor or controller in a programmable computer, the following description of the method may be applicable to each of the disclosed embodiments, and variations thereof.

FIG. 1 illustrates an embodiment wherein various steps of the conversion method are accomplished by and within an image output device such as printing system 10 having a processor (not shown) in operation with the printing system. It will be understood, of course, that printing systems having embedded and/or associated processor to process data representing images are well-known in the printing arts. In FIG. 1, system 10 receives as inputs: (a) a two-or highlight-color ink catalog 14 (commonly referred to as an ICT) that would be used to specify certain ink or toner colors to be used as the highlight or combination colors generally composed of black and a highlight color; and (b) print job data 16 defining an image or document containing an image.

The input of the ICT is passed directly to an automated ink catalog conversion function 20 that, as described above, may operate on the computer or controller used to control the function of the printing system 10 or a similar image output device. More specifically, conversion function 20 is intended to convert colors from the ink catalog to equivalent full-color descriptions. As a general example, an ICT entry may be specified to produce a color output that is a combination of both a black primary color and a non-black highlight color, and the conversion function 20 operates to identify a full-color (e.g., sRGB) description of that combination. From the conversion function 20, the full-color description is output to the rendering operation or engine 30, where it is combined with the print job data and the colors set forth in the print job data can be determined based upon the conversion. Hence, operation 30 converts the print job data that references a color into the equivalent full-color description for that color, thus enable the printing system 10 to handle and produce printed output in response to highlight-color input data.

It should also be appreciated that the operation of conversion function 20 may be both automatic, and in response to a signal or prompt by the rendering operation 30. In other words, the rendering operation may store the conversion equivalents generated by function 20 for use when required, or the rendering operation may request the conversions when it detects a color in the data stream for which it does not already have an equivalent conversion stored. Thus, the conversion may happen either in real-time or in a cached manner. As will be appreciated that specific details of the implementation may be driven, to a large extent, by the conversion speed required to provide a generally continuous flow of color data to the rendering operation 30 and to avoid impacting the performance of the printing system 10.

Referring next to FIG. 2, there is depicted an embodiment of the present invention that is suitable for operation in a batch conversion mode. In particular, the printing system 10 includes only a rendering operation and utilizes an associated controller or computer 40 to carry out the conversion function 20. In such an embodiment, the full-color catalog 50 is created by first generating full-color sRGB equivalent colors for each color in the catalog 14 and subsequently representing those colors in a printer-usable format as depicted by function 54.

Figure 3:
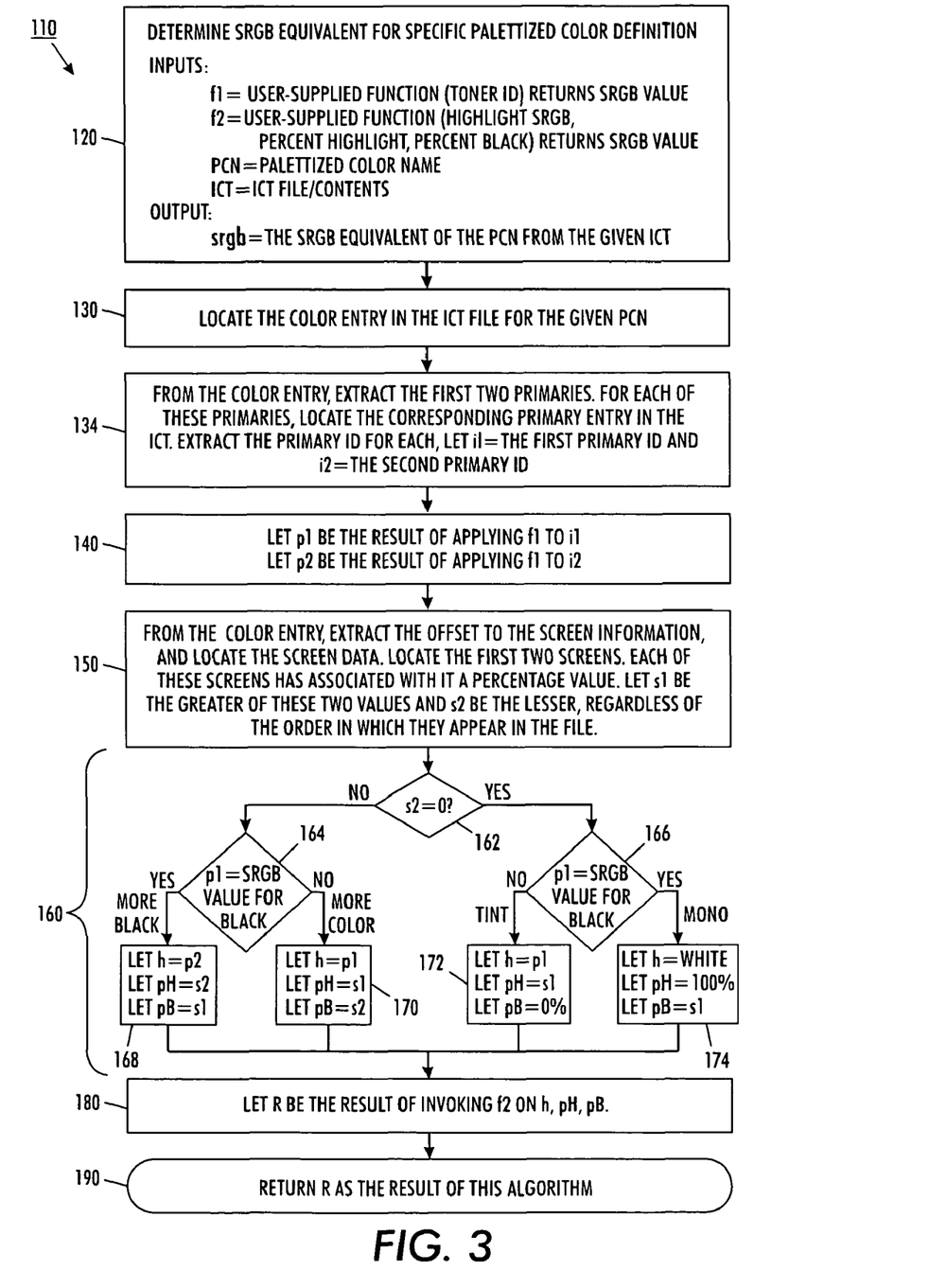
FIG. 3 is a flowchart depicting the general steps performed in accordance with the present invention.

In a general sense, the present invention is directed to a method 110, as illustrated in FIG. 3, for converting input data representing a color formed from only two primary colors into output data representing a color in a full color space. For example, the input may be two-color input data, a primary color and a secondary color. Each of the two primary colors is then mapped to an equivalent color defined in the full color space by applying a first mapping function. As will be appreciated, the mapping function may be a user-defined function, or it may be implemented programmatically. For example, a user could indicate that all occurrences of a Xerox-red highlight color called for in the print data stream are to be produced using an equivalent color having an sRGB of (1.0, 0.0, 0.0) and all occurrences of a Xerox-blue highlight color be produced with an equivalent sRGB of (0.1, 0.0, 0.9). Once the direct mapping is determined, the color combination (primary plus secondary) is characterized from the two-color input data using at least one rendering characteristic such as a screen percentage or similar aspect for each of the primary color and the secondary color. Then, based upon the rendering characteristics, and the primary and secondary colors, an intermediate output is generated to represent the combination of the primary and secondary colors, and the associated rendering characteristics and the intermediate output may be processed using a second function to generate the output data representing a single color defined in the full color space (e.g., sRGB).

It will be appreciated that although the particular examples are set forth using only certain color space descriptions, various color space descriptions and definitions may be employed in accordance with the present invention. In an embodiment of the method generally described above, the step of representing a combination of the primary and secondary colors, and the associated rendering characteristics, as an intermediate output, may include converting the secondary color into a hue, saturation, value (HSV) representation so as to facilitate the application of the percentage of highlight to the HSV representation for the color. In other words, by representing the intermediate colors in a color space that contemplates the use of a gray value and saturation level the combination of colors may be more easily accomplished. For example, as will be described in more detail below, the step of processing the intermediate output using a second function to generate the output data representing a single color defined in the full color space, may involve applying a percentage black to the intermediate value and then converting the intermediate value to a full-color representation using a programmatic function. The percentage black application to the color is facilitated by an intermediate color representation that includes value or a similar characterization of gray-scale or black content.

Having described the general methodology, attention is turned to FIG. 3 which depicts an exemplary embodiment of the method in accordance with the present invention. In particular, there is depicted a flow chart illustrating the various steps of method 110. As noted above, method 110 converts input data representing a color formed from only two primary colors to output data representing a color formed from at least three colors (e.g., full color).

As set forth at step 120, the methodology described in the flowchart, and in the example below, utilizes as inputs not only a set of colors from a highlight-color catalog, but also employs several functions to control the conversion in accordance with user-controlled and/or pre-programmed instructions.

Continuing with step 130, the process looks-up or locates the highlight-color in the color catalog, and receives the two-color input data in the form of two colors, a primary color and a secondary color, step 134. Next, as represented by step 140, the process continues by determining, for each color of the two-color input data, an equivalent color defined in a full color space and applying a first function (f1) to each color of the two-color input data (p1, p2). Next, as shown in step 150, a rendering characteristic is determined from the primary and secondary color input data. In the example embodiment, the rendering characteristic is a screen characteristic, or screen percentage value(s), for the primary color and the secondary color. Moreover, as indicated in step 150, an assumption is made relative to the screen percentage in order to allow the decision tree 160 to be implemented. In decision tree 160, a plurality of substeps are employed to determine if the lesser valued screen characteristic is equal to zero, step 162, comparing s2 to zero. As illustrated by substeps 166, 172 and 174, if the lesser screen characteristic is zero, an intermediate output is generated that is a function of only one of the primary and secondary colors. Otherwise, as illustrated by steps 164, 168 and 170 an intermediate output is generated as a function of both the primary and secondary colors, wherein the intermediate output includes a highlight color, a highlight color percentage and a black percentage.

More specifically, the step of generating an intermediate output that is a function of only one of the primary and secondary colors, includes determining if the primary color is black, step 166; and if the primary color is black, then at step 174 setting the highlight color to white, setting the highlight color percentage (pH) to one-hundred percent and setting the black percentage (pB) equal to the greater of the two screen characteristics. If the primary color is not black, then step 172 sets the highlight color to the primary color (h=p1) and the highlight color percentage (pH) equal to the greater of the two screen characteristics, and sets the black percentage (pB) to zero percent. As described herein, the screen characteristics are percentage values associated with the screens for the respective colors, however, alternative characteristics such as the names of the screens, or the bit patterns represented by the screens, may also be used. For such characteristics, the comparison of values for purposes of determining greater and lesser is achieved by comparing the percentage values associated with the screens.

In the other branch of decision tree 160, the substeps treat the situation where two colors are used in combination, and the step of generating an intermediate output that is a function of both the primary and secondary colors, includes determining if the primary color is black, step 164, and if so proceeding at step 168 by setting the highlight color to the secondary color, setting the highlight color percentage equal to the lesser of the two screen characteristics, and setting the black percentage equal to the greater of the two screen characteristics. Otherwise, as reflected by step 170, the process proceeds by setting the highlight color to the primary color and the highlight color percentage equal to the greater of the two screen characteristics, and setting the black percentage equal to the lesser of the two screen characteristics.

Once the intermediate color has been established it may then be converted to an output color (R) based upon the application of a second function (f2) to the intermediate color data as represented by step 180. Subsequently, the method concludes by outputting R at step 190, where R is representative of the equivalent color represented in a full-color space. R may determined by one of a number of conversion methodologies, where (f2) is implemented programmatically or by a look-up function. As the code example below illustrates f2 may be implemented by converting the intermediate highlight-color data to HSV in order to apply the percentHighlight to the saturation, then converting the result back to sRGB and applying the percentBlack to all components equally.

The following code example is illustrative of the user-supplied or defined functions in the methods described above. However, the example is not intended to limit the manner in which the steps of FIG. 3 may be accomplished.

```
public class Example {
    /**
     * A class encapsulating an sRGB value.
     */
    public static class SRGBValue {
        public final double redValue;
        public final double greenValue;
        public final double blueValue;
        public SRGBValue(
            final double red,
            final double green,
            final double blue) {
            this.redValue = red;
            this.greenValue = green;
            this.blueValue = blue;
        }
        public HSVValue convertToHSV( ) {
            HSVValue convertedValue;
            // Algorithms to convert sRGB to HSV are well known
            // and not presented here.
            return convertedValue;
        }
    }
    /**
     * A class encapsulating an HSV value.
     */
    public static class HSVValue {
        public final double hueValue;
        public final double saturationValue;
        public final double valueValue;
        public HSVValue(
            final double hue,
            final double saturation,
            final double value) {
            this.hueValue = hue;
            this.saturationValue = saturation;
            this.valueValue = value;
        }
        public SRGBValue convertToSRGB( ) {
            SRGBValue convertedValue;
            // Algorithms to convert HSV to sRGB are well known
            // and not presented here.
            return convertedValue;
        }
    }
    /*
     * The following should define all of the 'known' highlight
     * toner IDs and their corresponding SRGB values.
     * In this example, not all 'known' highlight toner
     * IDs are included.
     */
    public static final SRGBValue UNKNOWN_HIGHLIGHT_COLOR =
        new SRGBValue(0.0, 0.0, 0.0);
    public static final short BLACK_HIGHLIGHT_TONER = 0x00;
    public static final SRGBValue BLACK_HIGHLIGHT_COLOR =
        new SRGBValue(0.0, 0.0, 0.0);
    public static final short BLUE_HIGHLIGHT_TONER = 0x1c;
    public static final SRGBValue BLUE_HIGHLIGHT_COLOR =
        new SRGBValue(1.0, 0.0, 0.0);
    public static final short BROWN_HIGHLIGHT_TONER = 0x13;
    public static final SRGBValue BROWN_HIGHLIGHT_COLOR =
        new SRGBValue(0.65, 0.1, 0.1);
    public static final short CARDINAL_HIGHLIGHT_TONER = 0x16;
    public static final SRGBValue CARDINAL_HIGHLIGHT_COLOR =
        new SRGBValue(0.7, 0.03, 0.1);
    public static final short RED_HIGHLIGHT_TONER = 0x1d;
    public static final SRGBValue RED_HIGHLIGHT_COLOR =
        new SRGBValue(1.0, 0.0, 0.0);
    /**
     * An example of an implementation of user_function_1.
     * @param tonerID the tonerID of the toner for which the sRGB value
     * is required
     * @return the sRGBValue of the given tonerID
     */
    public SRGBValue user_function_1(final short tonerID) {
        /*
         * This example implementation simply uses pre-defined
         * values for each known toner ID. In this approach, the
         * user could fine-tune the values to achieve the best
         * overall results.
         */
        switch (tonerID) {
            case BLUE_HIGHLIGHT_TONER:
                return BLUE_HIGHLIGHT_COLOR;
            case BROWN_HIGHLIGHT_TONER:
                return BROWN_HIGHLIGHT_COLOR;
            case CARDINAL_HIGHLIGHT_TONER:
                return BROWN_HIGHLIGHT_COLOR;
            case RED_HIGHLIGHT_TONER:
                return BROWN_HIGHLIGHT_COLOR;
            default:
                return UNKNOWN_HIGHLIGHT_COLOR;
        }
    }
    /**
     * An example of an implementation of user_function_2
     * @param highlight the sRGB value for the highlight toner used
     * @param percentHighlight the percent of the highlight toner to mix
     * @param percentBlack the percent of the black toner to mix
     * @return the sRGB value representing this mix of highlight and
     * black
     */
    public SRGBValue user_function_2(
        final SRGBValue highlight,
        final double percentHighlight,
        final double percentBlack) {
        /**
         * This implementation generates an SRGB value based on the
         * given highlight color and the percents of highlight
         * and black to mix. This function may be implemented any
         * number of ways, including either programmatic (as illustrated
         * here), or by a look up function.
         * This example takes the simplistic approach of converting the
         * highlight color to HSV in order to apply the percentHighlight
         * to the saturation, then converting the result back to SRGB and
         * applying the percentBlack to all components equally.
```

```
      */
    final double percentNotBlack = (1 − percentBlack);
    // Convert the highlight value to HSV
    final HSVValue hsvHighlight = highlight.convertToHSV( );
    // Construct an intermediate HSV that differs only in
    // the saturation.
    final HSVValue hsvIntermediate =
       new HSVValue(
         hsvHighlight.hueValue,
         hsvHighlight.saturationValue * percentHighlight,
         hsvHighlight.valueValue);
    // Convert this value back to SRGB
    final SRGBValue srgbIntermediate =
    hsvIntermediate.convertToSRGB( );
    // Then, reduce each RGB element by the percent black factor
    final SRGBValue srgbResult =
       new SRGBValue(
          srgbIntermediate.redValue * percentNotBlack,
          srgbIntermediate.greenValue * percentNotBlack,
          srgbIntermediate.blueValue * percentNotBlack);
    // And return this...
    return srgbResult;
  }
}
```

Having described the specific operation of a method in accordance with the present invention, attention is returned to FIG. 2. As previously described, FIG. 2 depicts an embodiment wherein the method of the present invention may be employed so as to produce a full-color catalog 50 that includes colors converted from the two-color catalog (e.g., ICT). In one embodiment, the methodology may be employed to produce and store output in the nature of an extensible markup language (XML) schema. Thus, instead of providing color specification by bitmaps for the primary colors, the specification supports a standard color model, for example sRGB. This allows the existing ink definitions to be used on monochrome, two-color, and full-color printers, using existing rendering algorithms, to produce the standard color model representation on the particular printer.

The following exemplary schema illustrates a language for producing colors in an organized fashion. The first level or grouping identifies a set of color catalogs. Different departments or different people using one printer may have different requirements in terms of textures, densities and preferred primary inks. It is therefore necessary that there be more than one catalog available to the users. Next, within each catalog, a number of palettes are identified. One user may, for example, create palettes that can be described as "pastels", "bold", "winter", etc. Next, within each palette will be actual palette colors, defined in terms of a standard parametric color model, such as sRGB. The user expresses their color intent in this fashion without concern for the actual manner in which the printer will produce the printed output. The result is a complete collection of colors arranged in palettes and catalogs, which can be loaded into a full-color, two-color, or monochrome printer for printing.

The following example is illustrative of a schema in accordance with an aspect of the present invention, but is not intended to limit variations of the schema employed.

XML Schema Defining Full Color Ink Specification Language

```
<?xml version="1.0"?>
<schema xmlns:xsd="http://www.w3.org/1999/XMLSchema">
  <!--
    <xsd:annotation>
      <xsd:documentation>
        Palettized Ink definition schema.
      </xsd:documentation>
    </xsd:annotation>
  -->
  <xsd:simpleType name="paletteName" base="xsd:string">
     <xsd:maxInclusive value="32"/>
     <xsd:pattern value="[A–Z$a–z ]*"/>
  </xsd:simpleType>
  <xsd:simpleType name="catalogName" base="xsd:string">
     <xsd:maxInclusive value="6"/>
     <xsd:pattern value="[A–Z$]*"/>
  </xsd:simpleType>
  <xsd:simpleType name="inkName" base="xsd:string">
     <xsd:maxInclusive value="32"/>
     <xsd:pattern value=".*"/>
  </xsd:simpleType>
  <xsd:simpleType name="unitScale" base="xsd:decimal">
     <xsd:maxInclusive value="1"/>
     <xsd:minInclusive value="0"/>
  </xsd:simpleType>
  <xsd:element name="comment" type="xsd:string"/>
<xsd:element name="inkCatalog">
  <xsd:complexType>
    <xsd:element ref="comment" minOccurs="0"/>
    <xsd:element name="palette" minOccurs="0" maxOccurs="*">
      <xsd:complexType>
        <xsd:element ref="comment" minOccurs="0"/>
        <xsd:element name="ink" minOccurs="0" maxOccurs="*">
          <xsd:complexType>
            <xsd:choice>
              <xsd:element name="hsv">
                <xsd:simpleType base="unitScale" derviedBy="xsd:list">
                  <xsd:length value="3"/>
                </xsd:simpleType>
              </xsd:element>
              <xsd:element name="rgb">
                <xsd:simpleType base="unitScale" derviedBy="xsd:list">
                  <xsd:length value="3"/>
                </xsd:simpleType>
              </xsd:element>
            </xsd:choice>
            <xsd:attribute name="name" type="inkName"/>
          </xsd:complexType>
       </xsd:element>
       <xsd:attribute name="name" type="paletteName"/>
     </xsd:complexType>
   </xsd:element>
   <xsd:attribute name="name" type="catalogName"/>
   <xsd:attribute name="version" type="xsd:string"/>
  </xsd:complexType>
 </xsd:element>
</schema>
```

Sample Ink Catalog

```
<?xml version="1.0"?>
<?xml:stylesheet type="text/xsl" href="LCDSInkStyle.xsl"?>
<inkCatalog xmlns:xsi="http://www.w3.org/1999/XMLSchema/instance"
       xsi:noNamespaceSchemaLocation="LCDSInkSchema.xsd"
       name="CUSTOM" version="fullColor">
  <comment>
  This is a catalog comment.
  </comment>
  <palette name="MAIN">
  <comment>
  This palette contains...
  </comment>
  <ink name="Green">
     <comment>This is an ink comment</comment>
     <rgb>0.0 1.0 0.0</rgb>
  </ink>
  <ink name="Blue">
     <comment>This is an ink comment</comment>
     <rgb>0.0 0.0 1.0</rgb>
  </ink>
```

```
        <ink name="Red">
            <comment>This is an ink comment</comment>
            <rgb>1.0 0.0 0.0</rgb>
        </ink>
        <ink name="Pink">
            <comment>This is another ink comment</comment>
            <rgb>1.0 0.5 0.5</rgb>
        </ink>
        <ink name="Brown">
            <comment>This is still another ink comment</comment>
            <rgb>.7 .3 .3</rgb>
        </ink>
        <ink name="Huh">
            <hsv>.123 .5 .25</hsv>
        </ink>
    </palette>
    <palette name="SECOND">
        <comment>
          More palettes...
        </comment>
        <!-- ...etc... -->
    </palette>
</inkCatalog>
```

In recapitulation, the present invention is a method for taking a named, two-color definition and convert that two-color definition from the form used in highlight-color page composition and print systems into a full-color representation in order to enable the use of the two-color definitions on full-color printers. The method further contemplates the use of an extensible markup language schema to represent and store the equivalent, converted color definitions.

It is, therefore, apparent that there has been provided, in accordance with the present invention, a method for converting two-color or highlight-color data streams into full-color image definitions. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for converting input data representing a color formed from only two colors to output data representing a color formed from at least three colors, comprising the steps of:
   receiving the two-color input data in the form of two colors, a primary color and a secondary color;
   determining, for each color of the two-color input data, an equivalent color defined in a full color space by applying a first function to each color of the two-color input data;
   determining, from the two-color input data, a screen characteristic for the primary color and the secondary color;
   determining which screen characteristic is of a lesser value, and then determining if the lesser value is equal to zero;
   if the lesser value screen characteristic is zero, generating an intermediate output that is a function of only one of the primary and secondary colors, otherwise, generating an intermediate output that is a function of both the primary and secondary colors, wherein the intermediate outputs include a highlight color, a highlight color percentage and a black percentage; and
   processing the intermediate output using a second function to generate the output data representing a single color defined in at least three color space.

2. The method of claim 1, wherein the step of generating an intermediate output that is a function of only one of the primary and secondary colors, comprises:
   determining if the primary color is black; and
   if the primary color is black, setting the highlight color to white, setting the highlight color percentage to 100% and setting the black percentage equal to the greater of the two screen characteristics, otherwise
   setting the highlight color to the primary color and setting the highlight color percentage equal to the greater of the two screen characteristics, and setting the black percentage to 0%.

3. The method of claim 2, wherein the screen characteristics are percentage values associated with the screens for the respective colors.

4. The method of claim 1, wherein the step of generating an intermediate output that is a function of both the primary and secondary colors, comprises:
   determining if the primary color is black; and
   if the primary color is black, setting the highlight color to the secondary color and setting the highlight color percentage equal to the lesser of the two screen characteristics and setting the black percentage equal to the greater of the two screen characteristics, otherwise
   setting the highlight color to the primary color and the highlight color percentage equal to the greater of the two screen characteristics, and setting the black percentage equal to the lesser of the two screen characteristics.

5. The method of claim 4, wherein the screen characteristics are percentage values associated with the screens for the respective colors.

6. The method of claim 1, wherein the screen characteristic is a percentage value.

7. The method of claim 1, wherein the step of receiving the two-color input data comprises locating the color data in an ink catalog and retrieving the data therefrom.

8. The method of claim 1, wherein the first function is user-defined.

9. The method of claim 1, wherein the output data representing a single color defined in at least three color space is represented in the nature of an extensible markup language schema.

10. A method of instructing a printing system which prints using at least three colorants to print a predetermined color defined using only a first and second color, comprising:
    creating a schema to represent said first and second colors, said palette including, palette names and colorant names, for generating different colors;
    using a processor, determining, for each color of the two-color input data, an equivalent color defined in a full color space by applying a first function to each color of the two-color input data;
    determining, from the two-color input data, a screen characteristic for the primary color and the secondary color;
    determining which screen characteristic is of a lesser value, and then determining if the lesser value is equal to zero;
    if the lesser screen characteristic is zero, generating an intermediate output that is a function of only one of the primary and secondary colors, otherwise, generating an intermediate output that is a function of both the primary and secondary colors, wherein the intermediate outputs include a highlight color, a highlight color percentage and a black percentage; and
    processing the intermediate output using a second function to generate the output data representing a single color defined in at least three color space and storing said output data in a schema.

11. The method of claim 10, wherein said schema is represented in an extensible markup language.

12. The method of claim 10, wherein the schema includes a color catalog which itself includes a plurality of palettes.

13. The method of claim 10, wherein the palettes include colors defined in terms of a standard color model.

14. The method of claim 10, wherein the standard color model is sRGB.

* * * * *